(No Model.)  2 Sheets—Sheet 1.

E. WILLIAMS.
AERATION OF LIQUIDS.

No. 481,249. Patented Aug. 23, 1892.

Witnesses
J. M. Fowler Jr
Thomas Durant

Inventor
Edward Williams
By Church & Church
his Attorneys (No Model.) 2 Sheets—Sheet 2.

E. WILLIAMS.
AERATION OF LIQUIDS.

No. 481,249. Patented Aug. 23, 1892.

UNITED STATES PATENT OFFICE.

EDWARD WILLIAMS, OF ABERAYRON, ENGLAND.

AERATION OF LIQUIDS.

SPECIFICATION forming part of Letters Patent No. 481,249, dated August 23, 1892.

Application filed March 7, 1892. Serial No. 424,062. (No model.)

*To all whom it may concern:*

Be it known that I, EDWARD WILLIAMS, a subject of the Queen of England, residing at Aberayron, Wales, England, have invented certain new and useful Improvements in or relating to the Aeration of Liquids, of which the following is a specification.

My invention relates to apparatus for aerating beverages and other fluids by the introduction of carbonic-acid gas, whereby they are preserved and made more sparkling and refreshing.

My invention, however, is more particularly adapted for the revivifying or reaerating of such beverages as have undergone fermentation—such for example, as beer, porter, cider, &c.—standing in casks or barrels partly emptied or not, the contents of which have become flat, insipid, or stale through the dissipation of the original charge of carbonic-acid gas.

The apparatus I prefer to use consists of a pipe, one end of which is preferably tapered. This passes through the cask and may dip into the beverage to be treated, and the pipe is screwed into the cask or vessel. The pipe is provided with a tap for shutting off the gas after the liquid is charged, and its upper end is screw-threaded to receive the vessel in which the carbonic-acid gas is generated.

Figure 1:
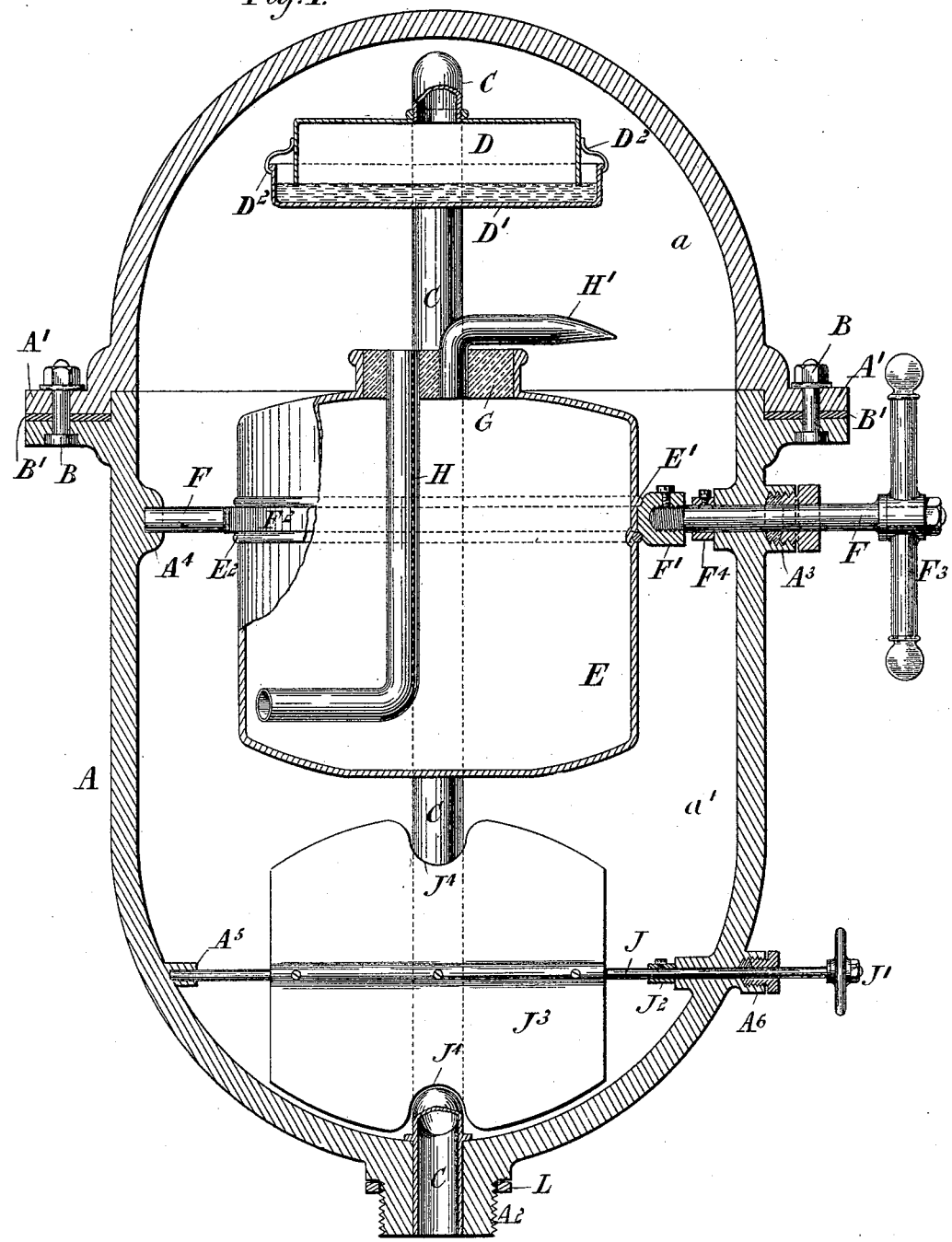
Figure 2:
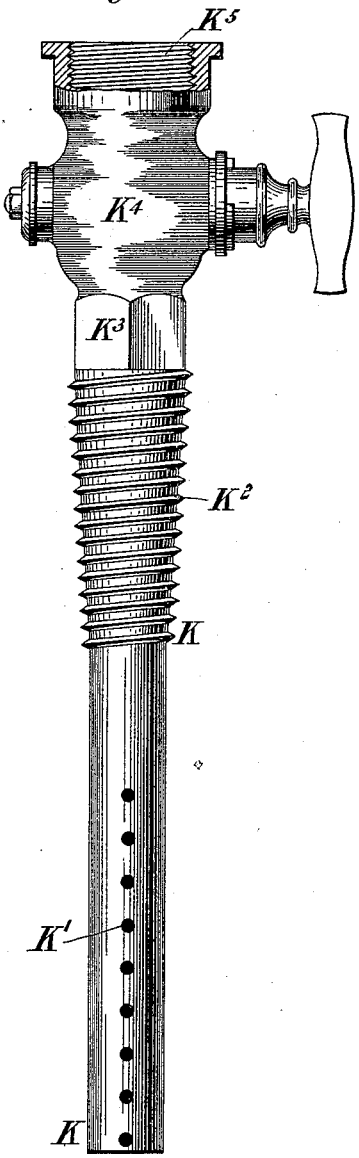

In the accompanying drawings, Figure 1 is a vertical section of the gas-generating vessel; and Fig. 2 is an elevation, with the upper part partly broken away, of the tube by which the said vessel is connected to the barrel or other reservoir the contents of which are to be aerated or impregnated with carbonic-acid gas.

A is the gas-generating chamber, which is formed in two parts $a$ $a'$, each preferably provided with a flange $A'$, so as to admit of the two parts being secured together, as by bolts and nuts B or equivalent means, the joint between these two parts being preferably checked, as shown, and made tight by means of a leather or equivalent washer $B'$.

$A^2$ is the outlet end of the chamber A, which is externally threaded to screw into the upper end $K^5$ of the tube shown in Fig. 2, as hereinafter described.

C is a tube soldered or otherwise tightly secured in the outlet $A^2$ and which passes up along the side of the chamber A and at its upper end is bent over and secured to a dome or cover D, so as to place the under side of said dome directly in communication with the outlet $A^2$.

$D'$ is a basin or trough into which the mouth of the dome D dips, and which may be supported by clips, such as $D^2$, secured to the dome D, and which is adapted to contain sufficient water or other liquid to form a liquid seal around the immersed edge of the dome. The trough $D'$ may, however, be supported in any other convenient manner, as by a bracket secured to the tube C. The basin $D'$ is of larger diameter or superficial area than the dome D, so as to allow the gas to pass between the overlapping edges.

E is a glass or equivalent vessel supported in any convenient manner, as by the shaft F, which for this purpose in the accompanying drawings is shown as formed in two parts, which are secured together by a screwed joint $F'$, and one of which parts is formed with a ring or hoop $F^2$, which fits in between a projecting rib $E'$, formed around the cylindrical part of the vessel E, and a removable ring $E^2$, which fits into a groove or annular recess formed in the vessel E, as shown, or, if desired, the hoop $F^2$ may be split and bolted together at one or more parts of its circumference, so that it may be sprung or otherwise introduced between the rib and ring $E'$ $E^2$, both of which in this arrangement may be formed as integral parts of the vessel E; or the vessel E may be supported in the hoop $F^2$ or connected to the shaft F in any other desired manner. The shaft F passes through a gland and stuffing-box $A^3$ and at its outwardly-extending end is provided with a handle $F^3$ or hand-wheel or equivalent to admit of its being rotated. The inner end of the shaft F is supported in a bearing $A^4$, the stuffing-box and gland $A^3$ providing the necessary support for the opposite end. The shaft is prevented from moving longitudinally outward by a collar or sleeve $F^4$.

The vessel E is closed by a stopper G, which is perforated to receive two tubes H $H'$, the former reaching to near the bottom of the vessel for admitting air to its interior and the latter for allowing the contents of the vessel to flow out when said vessel is inverted, as hereinafter described, this latter tube being preferably contracted at its outlet end, as shown. This arrangement is used when the vessel is to contain an acid solution or liquid; but when the acid is to be used in a solid or powdered form the vessel E is not closed by a stopper and may have a large wide mouth or be made in the form of a tray or trough.

J is a shaft extending across the lower part of the chamber A and supported at one end in a bearing $A^5$ and near its opposite end by the gland and stuffing-box $A^6$. On the outwardly-projecting end of shaft J is secured a handle or wheel J′ or equivalent to admit of its being rotated, and to prevent it from moving longitudinally outward a collar or sleeve $J^2$ is secured on it at the inner side of the wall of chamber A. On the shaft J is secured the blade or stirrer $J^3$, the edges of which are recessed, as at $J^4$, so that when it is rotated or oscillated it will not come in contact with the tube C.

The tube shown in Fig. 2 consists of a lower part K, with perforations K′, a taper screw $K^2$ for enabling it to be screwed into a barrel or other such vessel, a nut-shaped or equivalent part $K^3$ for enabling a spanner or equivalent to be applied when screwing the tube into the barrel, a cock $K^4$, and an internally-screwed part $K^5$ for receiving the outlet end $A^2$ of the gas-generating chamber A, as before described.

The parts K K′ $K^2$ $K^3$ $K^4$ $K^5$ for convenience when herein referred to as a whole are referred to as the "tube K."

When it is desired to aerate the contents of, say, a barrel or impregnate them with carbonic-acid gas, the tube K is inserted into the bunghole or into any other convenient part of the barrel, so that the perforations K′ are preferably submerged in the liquid to be treated, and the taper screw $K^2$ is screwed into said hole until a tight joint is made, a spanner being applied to the part $K^3$ for assisting in this operation, if desired. The vessel A is then screwed to the upper end of the tube K, a washer L, Fig. 1, being used for securing a tight joint between these two parts. The upper part or cover $a$ of the vessel A is then removed and a solution of a carbonate or bicarbonate, preferably, of soda is poured into the part $a'$, or the solution may be made in said part $a'$. The stopper G is then removed from the vessel E, the mouth of which is then directed upward, and a solution of acid, preferably citric or tartaric acid, is introduced into said vessel E, after which the stopper G is replaced. Sufficient water or other liquid is then poured into the trough D′ to submerge the edge of vessel D. The cock $K^4$ is turned off and the cover $a$ is bolted down upon $a'$, the washer B′ making a tight joint between the two parts $a$ $a'$. The shaft F by means of the handle $F^3$ is then slowly turned, so that the vessel E will be inverted and the contents will run out through the tube H′, air being meanwhile admitted into the vessel E through the tube H. The acid solution being thus poured on the carbonate or bicarbonate solution will cause carbonic-acid gas to be evolved, and this gas will pass through and be washed by the liquid in the trough D′ and pass through the tubes C and K and perforations K′, preferably, into the liquor to be aerated or impregnated, or, if desired, into the upper part of the vessel containing such liquor. When necessary, the contents of the bottom of the vessel A may be mixed, agitated, or stirred by turning the shaft J.

The operation when the acid is used in solid form—such as crystals or powder—will be well understood, the tray or receptacle containing such crystals merely being tilted so as to discharge its contents into the carbonate or bicarbonate solution in the lower part of chamber A.

By the before-described apparatus beverages or other liquids may be aerated and preserved or made sparkling and more palatable and refreshing by introducing or reintroducing the carbonic-acid gas. Beverages which have undergone fermentation—for instance, beer, porter, cider, and the like—or which have originally been charged with carbonic-acid gas and on consumption have become flat, insipid, or stale through the dissipation or deficiency of carbonic-acid gas intended to be contained in such beverages may be charged or recharged with carbonic-acid gas, so as to preserve and render them more fresh and palatable. This operation, moreover, prevents the introduction of such deleterious germs into the beverages as might be admitted were the atmosphere allowed to come into contact with them. The cock $K^4$ admits of the contents of a cask or other vessel being repeatedly charged with carbonic-acid gas, and it also admits of one gas-generating vessel A being used for aerating the contents of several casks, each provided with a similar pipe K and cock $K^4$.

It is to be understood that I do not limit myself to the exact construction of apparatus before described and shown in the accompanying drawings, as such arrangement is merely given as an example and is capable of being modified without departing from the spirit of my invention.

I claim—

1. In an apparatus such as described, the combination, with the outer vessel and the invertible vessel mounted within it, of the washer at the top of the outer vessel and the tube leading from the washer to the outlet-opening at the bottom of the outer vessel, substantially as described.

2. In an apparatus such as described, the combination, with the outer vessel having the discharge-opening at the bottom and the acid-receptacle within said outer vessel, of the gas-washer also within the outer vessel and at the top of the same and the tube leading from said washer down to the discharge-opening at the bottom, whereby the device is adapted to be applied directly in upright position to the vessel containing the liquid to be aerated, substantially as described.

3. In an apparatus such as described, the combination, with a gas-generating vessel, of an invertible vessel located within it and having two tubes, one forming the discharge-opening and the other extending to the bottom and forming the passage for the entrance of air as the vessel is inverted, and means for inserting said vessel from the exterior, substantially as described.

In testimony whereof I have hereto set my hand in the presence of the two subscribing witnesses.

EDWARD WILLIAMS.

Witnesses.
 DAVID BOWLN,
 ARTHUR CHARLES.